United States Patent Office 3,327,115
Patented June 20, 1967

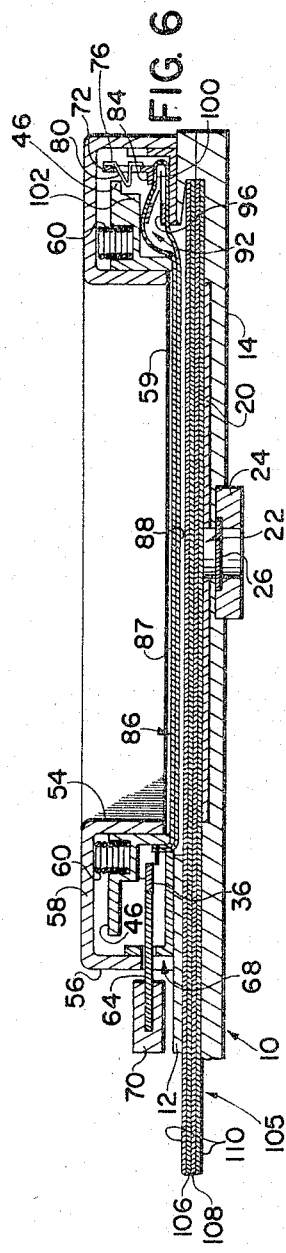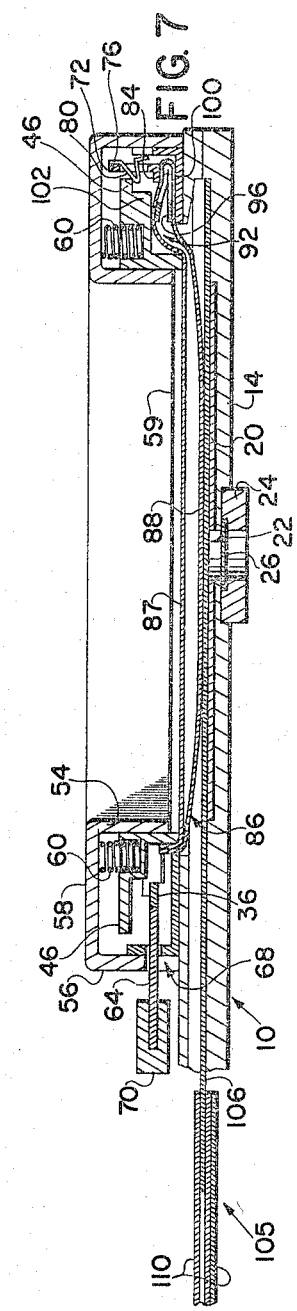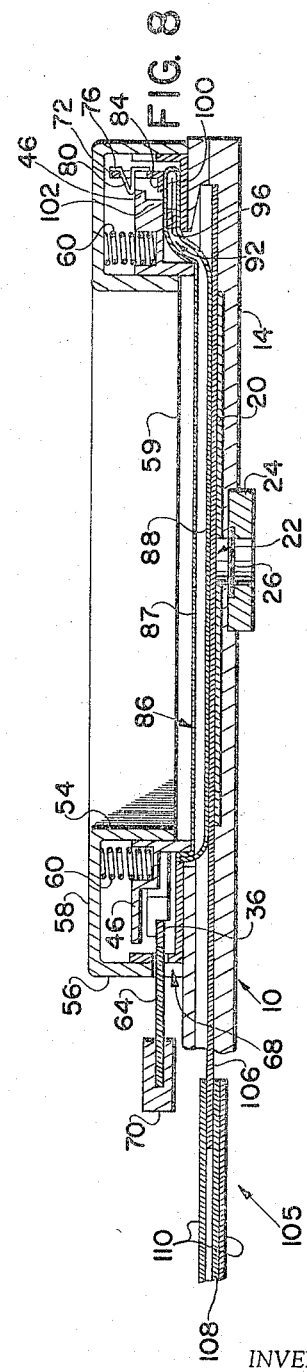

3,327,115
APPARATUS FOR HOLDING A PHOTOSENSITIVE SHEET IN A FILM PACKAGE WITH AN INFLATABLE BAG
Philip D. Bartlett, Worcester, Mass., assignor to Polaroid Corporation, Cambridge, Mass., a corporation of Delaware
Filed Oct. 12, 1964, Ser. No. 403,175
15 Claims. (Cl. 250—68)

The present invention relates to photography, and more specifically to novel apparatus for holding a sheet of photosensitive material in a desired position during exposure.

In copending U.S. application Ser. No. 397,938, filed Sept. 21, 1964, there is disclosed a film holding cassette especially useful in X-ray crystallography by the technique commonly known as back-reflection Laué photography. The cassette includes a light barrier in the form of a thin, flexible sheet for protecting the photosensitive film from visible light while allowing X-ray exposures with a minimum of attenuation or dispersion of the X-ray beam. Most previously known cassettes utilize a rigid light barrier which may be spring loaded against the film to hold the latter in flat and intimate contact with the intensifying screen. Since the light barrier of the cassette disclosed in the aforementioned application is flexible, other means are provided for holding the film against the intensifying screen during exposure. The present invention has as a principal object the provision of novel and improved means for maintaining a photographic sheet flat within a cassette or magazine.

A further object of the invention is to provide an X-ray cassette having a flexible light barrier wherein the negative is held in contact with the intensifying screen during exposure by means of a bag which is inflated as it moved toward the negative, the air pressure within the bag assisting in maintaining the negative in contact with the screen.

Another object is to provide, in combination with an X-ray cassette having a portion movable into contact with the film for maintaining the latter in contact with the intensifying screen during exposure, means for applying air pressure to the member which contacts the film in response to its movement into contact therewith.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 6–9 are a series of side elevational views in section through the longitudinal center of the apparatus, illustrating a series of steps in preparing for an exposure;

One of the elements of the invention, in the embodiment described herein, is a previously known item of photographic equipment presently manufactured by Polaroid Corporation, Cambridge, Mass., and known as the Land 4 x 5 Film Holder No. 500. This film holder may be utilized to position for exposure, and subsequently assist in the development of, a film assemblage in the form of a packet including a lighttight envelope for enclosing the photosensitive sheet. Film packets of the type described are known as "self-developing" film packets, a specific example being those manufactured by Polaroid Corporation and known as Land Film Packets, type 52, 55, 57, 510, etc. Both the film holder and packets are described in detail in U.S. Patent No. 2,933,993, of Albert J. Bachelder et al., issued Apr. 26, 1960. Although not limited to employment with film holders and packets of this specific type, the present invention will be so described since the technique of rapid exposure, development and analysis with which the invention is concerned is best achieved through the use of such. It is therefore to be understood that the invention may be practised with any suitable photosensitive medium with the basic film-holding means comprising a previously known cut film holder.

Accordingly, film holder 10, shown fragmentarily in FIGS. 1, 2, 4 and 6–9, comprises basically a film holder of the type described in aforementioned Patent No. 2,933,993, with certain modifications described hereinafter which may be incorporated after manufacture of the holder in the usual manner. Film holder 10 includes upper and lower body portions 12 and 14, respectively, which may be retained in engagement by any suitable means such as clamps 16 which engage marginal edges of the two body portions. Suitable spacer means are included to maintain a space between the interior opposing surfaces of body portions 12 and 14, as may be best seen in FIGS. 6–9, thereby permitting insertion of the film packet described hereinafter between the body portions.

Figure 1:
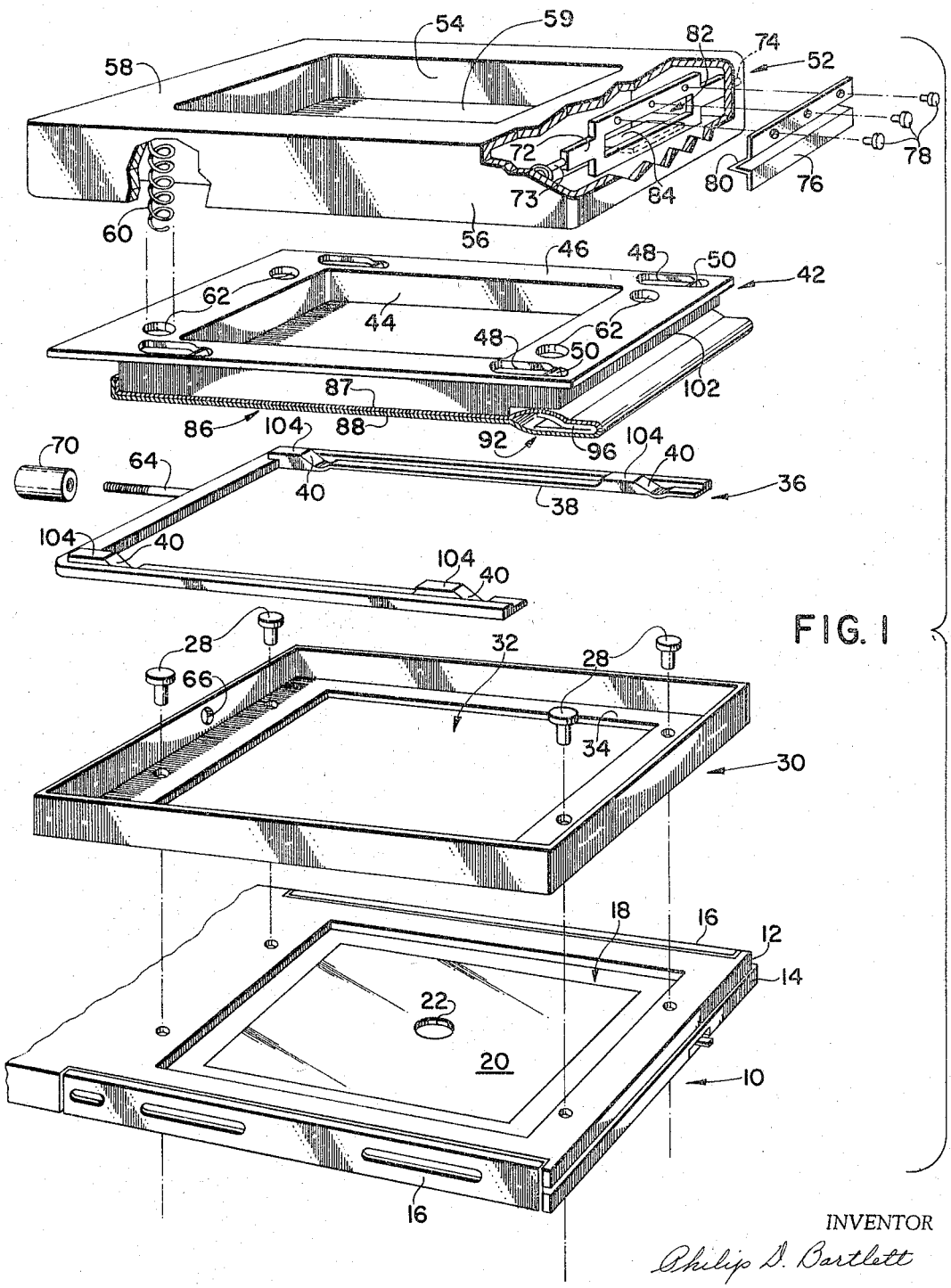
FIGURE 1 is an exploded perspective view of the apparatus of the invention, with portions broken away.

Upper body portion 12 includes a rectangular opening 18 which forms the exposure opening for a photosensitive film positioned within holder 10, as will appear more fully hereinafter. A rectangular intensifying screen 20 is inserted into a recess which may be formed in lower body portion 14 so that the surface of the screen seen in FIGURE 1 is flush with the interior surface of body portion 14. Circular opening 22 extends through body portion 14 and intensifying screen 20 of holder 10. Bushing 24, as seen in FIGS. 6–9, encircles opening 22 and is fixedly secured to body portion 14 by any appropriate fastening means. Light seal 26 is inserted between bushing 24 and body portion 14 and preferably comprises a relatively thin material opaque to visible light and transparent to X-rays. The thickness and consistency of the material of light seal 26 should be such that an X-ray beam passing therethrough is not significantly attenuated by the light seal. Black acetate plastic in the order of 0.005" thick has been found suitable for this purpose. The addition of intensifying screen 20, opening 22, bushing 24, and light seal 26, and the repositioning of an internal linkage and stop mechanism (not shown, but pointed out in more detail hereinafter) are the only alterations which are performed on the standard Land 4 x 5 Film Holder No. 500 in forming film holder 10 of the present embodiment of this invention. Although shown somewhat diagrammatically and fragmentarily in the present drawings, it is again pointed out that a complete description of the Land 4 x 5 Film Holder No. 500 is to be found in U.S. Patent No. 2,933,993. Additional descriptive material relating to this film holder and the film assemblage or packet intended for use therein may be found in U.S. Patent No. 3,119,317 of Dexter P. Cooper, Jr. et al. issued Jan. 28, 1964, wherein the subject holder and film packet are described in combination with other apparatus in a further modification of the method of use of the holder and film packet.

Fixedly attached to film holder 10 by means of rivets 28 is frame 30, having a rectangular opening 32, conforming substantially in size to and positioned congruently with opening 18, bounded by surface 34. U-shaped slide member 36 is seated with its lower surface 38 in sliding contact with surface 34 of frame 30. The upper portion of slide member 36 includes cam surfaces 40 disposed at an angle to the direction of sliding movement of slide member 36 upon surface 34.

Retaining element 42 includes vertically disposed rectangular wall 44 and horizontally disposed rectangular wall 46 extending outwardly from the upper edge of wall 44. Wall 46 includes elongated openings 48, in a portion of each of which are rotatably mounted small rollers 50. The outside dimensions of vertically disposed wall 44 are such that it is adapted to extend through opening 32 of frame 30 and exposure opening 18 of film holder 10. The outside dimensions of horizontally disposed wall 46 are such that retaining element 42 will fit within the vertically disposed walls of frame 30, as may be seen in FIGS. 6–9.

Cover element 52 includes interior vertically disposed side wall 54, and exterior vertically disposed side wall 56, connected by horizontally disposed wall 58 to form an element of U-shaped cross section. Cover element 52 is arranged to lie in covering relationship to retaining element 42 to prevent entry of light into holder 10 between the portion of holder 10 bounding exposure opening 18 and wall 44 of element 42. Wall 54 of the cover element defines a central opening in registration with the exposure opening in the film holder and that defined by wall 44 of element 42. Light barrier 59 is secured to cover element 52 to extend across and block the rectangular opening defined by wall 54. Barrier 59 is made of a material with characteristics similar to light barrier 26; for this application a .004" thick, opaque, triacetate sheet is well suited.

Positioned between vertically disposed walls 54 and 56 are springs 60, one of which may be seen in FIG. 1 where a fragment of exterior, vertically disposed wall 56 has been cut away. Spring seats 62 are formed in horizontally disposed wall 46 of retaining element 42. The spring seats comprise openings slightly larger than the outside diameter of springs 60 extending through only a portion of the thickness of wall 46. When the apparatus of FIGURE 1 is assembled stem 64, which is fixedly attached to slide element 36, extends through opening 66 in frame 30 and through cutaway portion 68 (FIGS. 6–9) of cover element 52. Knob 70 is then affixed to the end of stem 64, thereby allowing reciprocal sliding movement of sliding element 36 upon surface 34 of frame 30.

Pivotal element 72 is mounted within one end of cover 52, between walls 54 and 56, by means of pins 73 and 74 about which element 72 may be rotated. Resilient member 76 is affixed to pivotal element 72 by means of rivets 78 and includes a lip 80 which extends through opening 82 in the pivotal element. Projection 84 extends perpendicularly from a lower, central portion of pivotal element 72.

Figure 10:
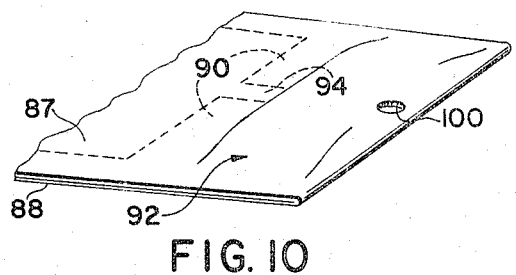
FIG. 10 is a fragmentary, perspective view of a portion of the apparatus.
Figure 11:
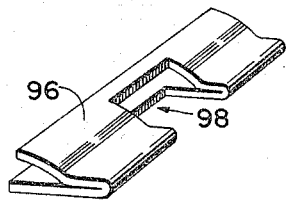
FIG. 11 is a perspective view of another element of the apparatus.

Air bag 86 includes upper wall 87 and lower wall 88 which are laminated or otherwise sealed together around their peripheries and extend past the seal indicated at 90 in FIG. 10 to form reservoir 92. An unsealed air passage 94 extends through seal 90 to provide communication between bag 86 and reservoir 92. Spring element 96 is inserted within reservoir 92 and is biased to maintain the latter in a normally open or inflated condition. As best seen in FIG. 11, spring 96 includes a central cut-out portion 98 which is in registration with hole 100 in upper wall 87 near one edge of reservoir 92. Retaining element 42 includes step 102 extending across one end of the element under horizontal wall 46 to engage the upper surface of reservoir 92.

Figure 2:
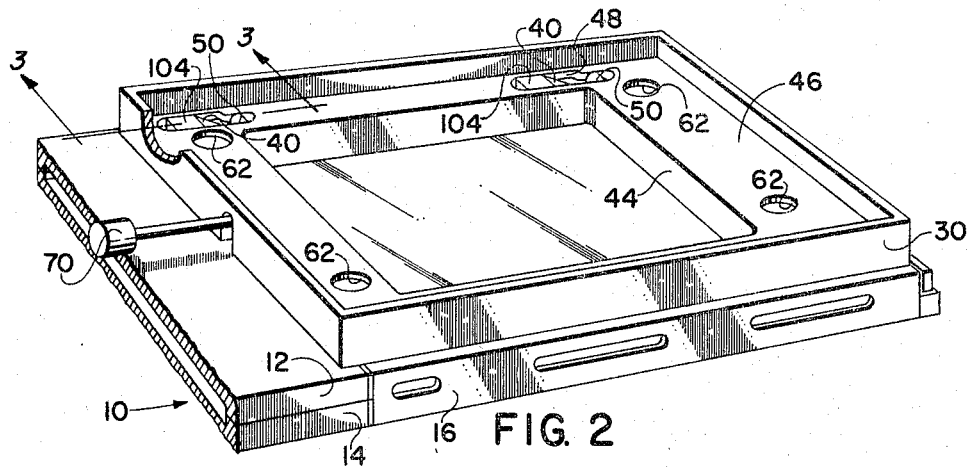
FIG. 2 is a perspective view of a portion of the apparatus of FIGURE 1 showing certain movable elements in a first position.
Figure 3:
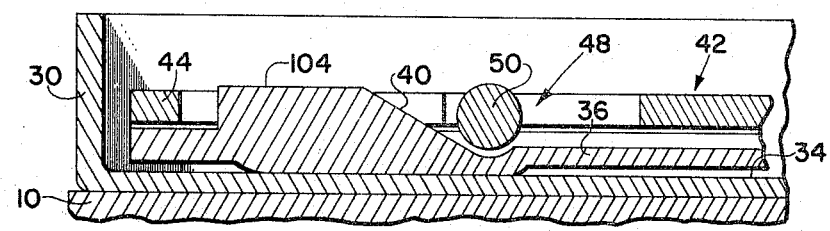
FIG. 3 is an enlarged, fragmentary, side elevational view in section on the line 3—3 of FIG. 2.

In FIG. 2 the elements are shown assembled with cover element 52 removed and knob 70 moved outwardly from the apparatus, whereby slide element 36 is moved to the left as seen in this figure. An enlarged side sectional view of a portion of the apparatus is shown in FIG. 3 with the elements in the position of FIG. 2, i.e., with slide element 36 moved toward the left. Here it may be seen that roller 50 of retaining element 42 is positioned adjacent the lower end of cam surface 40. The upper portion of cam surface 40, which terminates in conjunction with horizontally disposed surface 104, extends through an enlarged portion of elongated opening 48.

Figure 4:
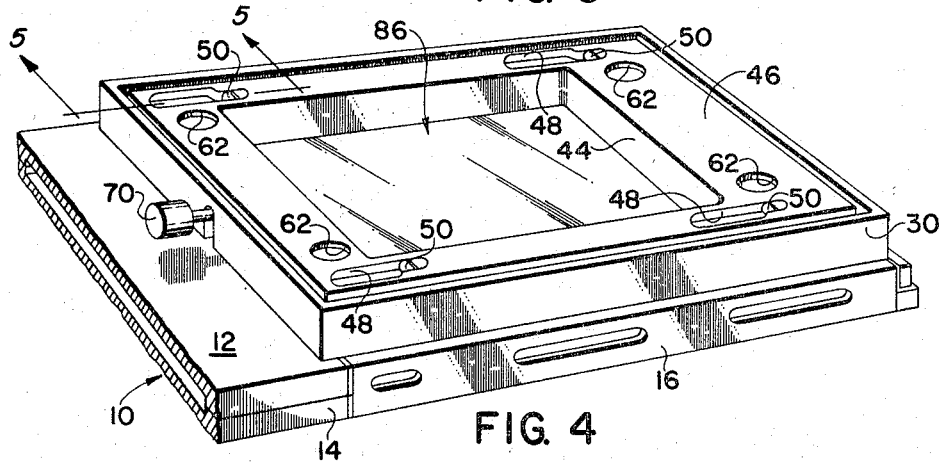
FIG. 4 is a perspective view, as in FIG. 2, showing the movable elements in a second position.
Figure 5:
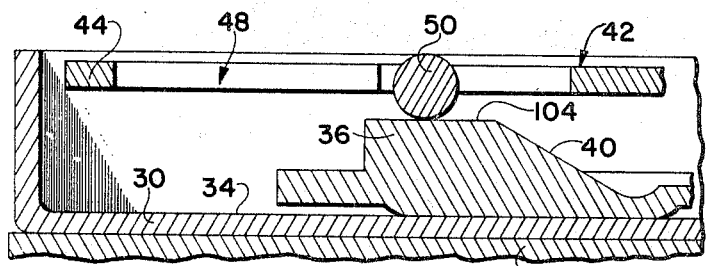
FIG. 5 is a side elevational view, as in FIG. 3, in section on the line 5—5 of FIG. 4.

Movement of knob 70 from the position shown in FIG. 2 to that shown in FIG. 4 moves slide 36 along surface 34 from the FIG. 3 to the FIG. 5 position. Element 42 is restrained against horizontal movement by the rather close fit of wall 46 within frame 30. Thus, as slide 36 is moved toward the right, as seen in FIGS. 3 and 5, roller 50 rides up cam surface 40 and element 42 is moved vertically against the force of springs 60. After movement of slide 36 to the FIG. 5 position, roller 50 rests on horizontal surface 104 of the slide, thus maintaining element 42 in the upper position. Movement of knob 70 back to the FIG. 2 position causes movement of slide 36 back to the left and allows element 42 to return to the lower position under the force exerted by springs 60.

The operation of the above-described apparatus in conjunction with a film packet is illustrated in the side sectional views of FIGS. 6–9. The film packet, indicated generally by reference numeral 105, may comprise a Polaroid Land Series 50 film packet, manufactured by Polaroid Corporation, Cambridge, Mass. Such packets include a single flexible sheet serving as a support for a photosensitive layer, indicated in the present drawings by the reference numeral 106, sometimes referred to hereinafter as the negative. Second sheet 108 is adapted to receive, upon proper chemical treatment, a positive transfer image from a developed photographic image formed in the photosensitive portion of sheet 106. Sheets 106 and 108 are initially arranged within opaque envelope 110 which protects the photosensitive portion from actinitic light prior to exposure and which is slightly wider than sheets 106 and 108 to permit relative slidable movement of the sheets within the envelope. Such film packets also normally include an elongated liquid-carrying container holding a supply of a processing fluid adapted to be released from the container and spread between sheets 106 and 108 to effect development of a latent image formed in the photosensitive portion of sheet 106 and formation of a positive transfer image in sheet 108. Release of the processing fluid from the container and spreading it between the sheets to be processed is normally accomplished by manually advancing the film packet through a pair of pressure rolls which cause the container to rupture and the fluid to be released therefrom. The container, pressure rolls, etc., are not shown in the present drawings, being well known in the art and presently in wide commercial use.

When loading film packet 105 into the apparatus, knob 70 is moved to the right or inward position, as shown in FIG. 6, whereby retaining element 42 is in the upper position. The packet is inserted with the photosensitive surface of sheet 106 facing intensifying screen 20. Once the packet has been inserted within the lighttight interior of holder 10, sheet 108 and envelope 110 may be partially withdrawn to place negative 106 in position for exposure without interference from envelope 110 and sheet 108. This is accomplished, according to conventional construction of such film packets and holders, by attaching a clip to the right hand end (as shown in FIGS. 6–9) of negative 106. This end of envelope 110 is left open, but the clip is arranged to extend around the open end and provide a light shield for maintaining the film packet in a lighttight condition. When the packet has been fully inserted in the holder, as in FIG. 6, the clip is engaged by suitable detents or other such engagement means within holder 10. Envelope 110, to which sheet 108 is attached, may then be withdrawn toward the left to the position shown in FIG. 7. Negative 106 is retained in the position of FIG. 6 since it is attached to the clip which is engaged by the detent means within the holder. Suitable stop means may be provided for limiting the extent of withdrawal of envelope 110 and sheet 108. The stop means provided in the usual commercial embodiment of the film holder and packet comprise a movable, mechanical stop member in the holder and an element such as a piece of tape or cardboard on the outside of the envelope. The stop member is arranged to allow sliding insertion of the packet into the holder, but upon withdrawal of the envelope, with the clip and negative being held by the aforementioned detent means, the element thereon engages the stop means and prevents complete withdrawal of the envelope from the holder. After exposure and reinsertion of the envelope, the stop member is moved, through a linkage arrangement, out of the path of movement of the element on the envelope to allow complete withdrawal from the holder.

Since the film packet is inserted in the holder of the present invention with the photosensitive surface facing the intensifying screen, which is the reverse of the normal insertion for ordinary 4 x 5 photography in the usual comercial embodiment, either the stop mechanism in the holder or the element on the envelope must be reversed to the opposite side for proper operation. In the preferred embodiment of the present invention, the stop member and linkage arrangement is moved to the opposite side of the holder to allow operation with commercially available film packets without modification thereof. The arrangement of the stop member on the opposite side of the holder is a simple mechanical expedient, well within the skill of the ordinary mechanic. The clip, detent means, stop means, etc., are not shown in the present drawings, being well known in the art, a full description being found in aforementioned U.S. Patent 2,933,993.

With the elements in the position of FIG. 7, negative 106 is in position for exposure with its photosensitive surface facing intensifying screen 20. The interior of holder 10 is maintained in a lighttight condition by cover 52 and light barriers 26 and 59. It is essential that during exposure the negative be held with its photosensitive surface flat and in continuous contact with the opposing surface of the intensifying screen. This is accomplished by moving knob 70 to the left or outward position, as shown in FIG. 8. This moves slide 36 toward the left and allows rollers 50 to move down cam surfaces 40 to the lower end thereof, as shown in FIG. 3. Springs 60 exert the necessary force on retaining element 42 for moving the latter to the position of FIG. 8.

As element 42 is moved toward the lower position wall 46 engages lip 80 of resilient member 76 and moves the member toward the right, as seen in FIG. 7. Pivotal element 72 is restrained against counterclockwise rotation by projection 84 which rests on the edge of reservoir 92, covering hole 100, thus rendering the interior of air bag 86 and reservoir 92 airtight. When slide 36 is moved completely to the left, by movement of knob 70, element 42 reaches its lower position, shown in FIG. 8. Wall 46 has moved past lip 80, thus allowing member 76 to return to its original position by virtue of its resilient mounting.

As element 42 is moved from the upper to the lower position, step 102 engages reservoir 92 and forces the air therein into bag 86. As the bag is inflated and moved towards negative 106, lower wall 88 engages the surface of the negative and is held firmly in contact therewith by the positive air pressure within the bag since upper wall 87 is stretched taut across the opening defined by side walls 44 of element 42. Thus, the negative is held in intimate contact with the intensifying screen and is ready for exposure.

With the elements in the position of FIG. 8 an X-ray beam may be directed through opening 22 to strike a crystal or other such object positioned on the opposite side of holder 10. The beam will pass through light barrier 26, negative 106, air bag 86 and light barrier 59 to strike the crystal and be reflected back through light barrier 59, air bag 86 and negative 106 to impinge upon intensifying screen 20. The X-rays striking the screen cause the latter to emit light in the areas of impingement, thus exposing the adjacent photosensitive surface of the negative. Development of the resulting latent image reveals the structure or orientation of the crystal from which the X-ray beam has been reflected.

Figure 9:
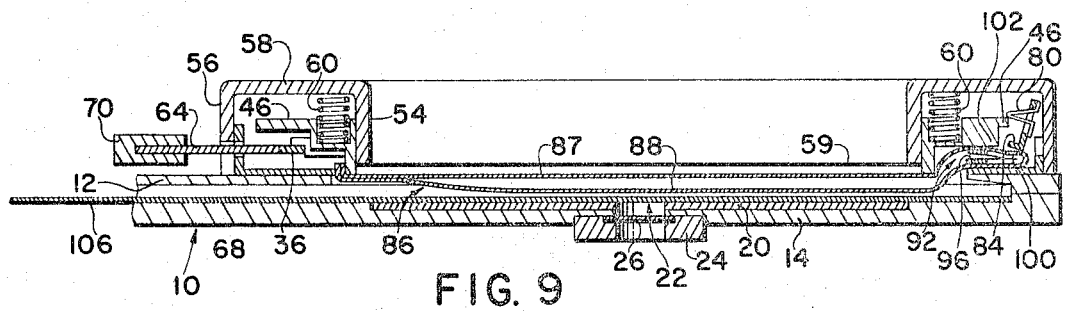

After exposure in the above-described manner, knob 70 is again moved toward the right or inward position, as shown in FIG. 9. Wall 46 pushes upwardly on lip 80, thus causing clockwise rotation of element 72 since resilient member 76 is restrained against such movement by contact of the lower portion thereof with element 72. Projection 84 is removed from its covering relationship with hole 100 allowing communication between reservoir 92 and the outside air. Spring 96 causes reservoir 92 to open and reinflate as the elements are returned to the position of FIG. 6. Bag 86 is now out of engagement with negative 106 so that envelope 110 may be reinserted over the negative with second sheet 108 in superposition therewith. The detents or other such holding means may then be released from the clip, leaving film packet 105 free to be drawn out of holder 10 and through appropriate pressure-applying means to effect release and spreading of the processing fluid and development of the exposed negative.

It is to be understood that the thickness of the various elements of film packet 105 relative to the elements of the apparatus have been greatly exaggerated for purposes of illustration. This is likewise true of the interiors of reservoir 92 and air bag 86 in the inflated condition. It is also possible to eliminate light barrier 59 by constructing air bag 86 with one or both walls opaque to visible light while allowing passage of X-rays.

It may thus be seen that the apparatus of the invention provides means for rapidly and precisely exposing and processing film in X-ray crystallography applications, for example, while using basic photographic apparatus and film packets which are presently commercially available. Back Laué exposures may be effected without the necessity of cutting a hole in the negative or providing other special apparatus. Improved means are also provided for maintaining the cassette in a lighttight condition and for holding the negative in intimate contact with the intensifying screen during exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Apparatus for holding a sheet of photosensitive material during exposure thereof, said apparatus comprising in combination:
  (a) a cut film holder having a frontal exposure opening and a surface rearwardly of said opening for supporting said photosensitive sheet during exposure;
  (b) a flexible sheet element comprising one wall of an enclosed bag arranged in covering relation to said exposure opening;
  (c) means for selectively moving said sheet element toward and away from said surface;
  (d) means for applying positive and substantially uniform air pressure to said sheet element on the side thereof opposite said surface in response to movement of said sheet element toward said surface, whereby said photosensitive sheet is engaged between said sheet element and said surface and urged into continuous contact with said surface;
(e) means for inflating said bag in response to movement of said sheet element toward said surface, thereby creating said air pressure; and
(f) means for deflating said bag in response to movement of said sheet element away from said surface.

2. Apparatus for holding a sheet of photosensitive material during exposure thereof, said apparatus comprising, in combination:
(a) a cut film holder having a frontal exposure opening and a surface rearwardly of said opening for supporting said photosensitive sheet during exposure;
(b) a flexible sheet element comprising one wall of an enclosed bag arranged in covering relation to said exposure opening;
(c) means for selectively moving said sheet element toward and away from said surface;
(d) means for applying positive and substantially uniform air pressure to said sheet element on the side thereof opposite said surface in response to movement of said sheet element toward said surface, whereby said photosensitive sheet is engaged between said sheet element and said surface and urged into continuous contact with said surface;
(e) means for inflating said bag in response to movement of said sheet element toward said surface, thereby creating said air pressure;
(f) means for deflating said bag in response to movement of said sheet element away from said surface; and
(g) light-barrier means substantially opaque to visible light and transparent to X-rays, arranged in covering relation to said exposure opening.

3. Apparatus for holding a sheet of photosensitive material during exposure thereof, said apparatus comprising, in combination:
(a) a cut film holder having a frontal exposure opening and a surface rearwardly of said opening for supporting said photosensitive sheet during exposure;
(b) a flexible sheet element comprising at least one wall of an enclosed bag, opaque to visible light and transparent to X-rays, arranged in covering relation to said exposure opening;
(c) means for selectively moving said sheet element toward and away from said surface;
(d) means for applying positive and substantially uniform air pressure to said sheet element on the side thereof opposite said surface in response to movement of said sheet element toward said surface, whereby said photosensitive sheet is engaged between said sheet element and said surface and urged into continuous contact with said surface;
(e) means for inflating said bag in response to movement of said sheet element toward said surface, thereby creating said air pressure; and
(f) means for deflating said bag in response to movement of said sheet element away from said surface.

4. Holding apparatus for an X-ray film packet including a photosensitive sheet positioned within said apparatus for exposure, said apparatus comprising, in combination:
(a) a cut film holder having a frontal exposure opening and an intensifying screen mounted in registration with said exposure opening whereby said photosensitive sheet may be positioned within said holder between said exposure opening and said intensifying screen;
(b) a retaining element including a wall member defining an opening and adapted to extend through said exposure opening around the periphery thereof;
(c) at least one flexible sheet element comprising one wall of an enclosed bag arranged in covering relation to said opening defined by said wall member;
(d) cam means for manually moving said retaining element between a first position, wherein said wall member extends through said exposure opening and said photosensitive sheet is engaged between said flexible sheet element and the opposing surface of said holder, and a second position, wherein said sheet element is moved away from engagement with said photosensitive sheet;
(e) means for applying a positive air pressure to the surface of said sheet element opposite said photosensitive sheet in response to movement of said retaining element to said first position;
(f) means for biasing said retaining element toward movement to said first position;
(g) means for inflating said bag in response to movement of said sheet element toward said surface, thereby creating said air pressure; and
(h) means for deflating said bag in response to movement of said sheet element away from said surface.

5. Holding apparatus for an X-ray film packet including a photosensitive sheet positioned within said apparatus for exposure, said apparatus comprising, in combination:
(a) a cut film holder having a frontal exposure opening and an intensifying screen mounted in registration with said exposure opening whereby said photosensitive sheet may be positioned within said holder between said exposure opening and said intensifying screen;
(b) a retaining element including a wall member defining an opening and adapted to extend through said exposure opening around the periphery thereof;
(c) at least one flexible sheet element comprising one wall of an enclosed bag arranged in covering relation to said opening defined by said wall member;
(d) cam means for manually moving said retaining element between a first position, wherein said wall member extends through said exposure opening and said photosensitive sheet is engaged between said flexible sheet element and the opposing surface of said holder, and a second position, wherein said sheet element is moved away from engagement with said photosensitive sheet;
(e) means for applying a positive air pressure to the surface of said sheet element opposite said photosensitive sheet in response to movement of said retaining element to said first position;
(f) means for biasing said retaining element toward movement to said first position;
(g) means for inflating said bag in response to movement of said sheet element toward said surface, thereby creating said air pressure;
(h) means for deflating said bag in response to movement of said sheet element away from said surface; and
(i) light-barrier means substantially opaque to visible light and transparent to X-rays, arranged in covering relation to said exposure opening.

6. Holding apparatus for an X-ray film packet including a photosensitive sheet positioned within said apparatus for exposure, said apparatus comprising, in combination:
(a) a cut film holder having a frontal exposure opening and an intensifying screen mounted in registration with said exposure opening whereby said photosensitive sheet may be positioned within said holder between said exposure opening and said intensifying screen;
(b) a retaining element including a wall member defining an opening and adapted to extend through said exposure opening around the periphery thereof;
(c) means for moving said retaining element between a first position, wherein said wall member extends through said exposure opening towards said photosensitive sheet, and a second position, wherein said element is moved away from said photosensitive sheet;

(d) a sealed, air-tight bag arranged in covering relation to said opening defined by said wall member;

(e) an air reservoir deflatable in response to movement of said retaining element to said first position and inflatable in response to movement of said retaining element to said second position;

(f) an air passage between said reservoir and said bag, whereby the air from said reservoir is forced into said bag as said reservoir is deflated, thereby producing a positive air pressure within said bag and urging the latter against said photosensitive sheet when said retaining element is in said first position; and (g) light barrier means arranged to lie in covering relation to said exposure opening in both positions of said retaining element, said barrier means being opaque to visible light and substantially transparent to X-rays, thus allowing X-ray exposure of said photosensitive sheet while protecting the latter from exposure by visible light.

7. The invention according to claim 6 wherein said light barrier means comprises a flexible sheet of plastic material.

8. The invention according to claim 11 wherein at least a portion of said bag comprises said light barrier means.

9. The invention according to claim 6 wherein said air reservoir includes an opening communicating with the atmosphere and movable means are provided to lie in normally covering relationship to said opening, thus rendering said reservoir airtight, said movable means being so constructed and arranged as to be moved to uncover said opening in response to movement of said retaining element from said first toward said second position.

10. The invention according to claim 6 wherein biasing means are provided for maintaining said reservoir in a normally inflated condition when said retaining element is moved away from said first position.

11. Holding apparatus for an X-ray film packet including a photosensitive sheet positioned within said apparatus for exposure, said apparatus comprising, in combination:

(a) a cut film holder having a frontal exposure opening and an intensifying screen mounted in registration with said exposure opening whereby said photosensitive sheet may be positioned within said holder between said exposure opening and said intensifying screen;

(b) a retaining element including a wall member defining an opening and adapted to extend through said exposure opening around the periphery thereof;

(c) biasing means urging said retaining element toward movement to a first position, wherein said wall member extends through said exposure opening to engage said photosensitive sheet between said holder and the opposing surface of said wall member around the periphery of said exposure opening;

(d) means for moving said retaining element between said first position and a second position, with said opposing surface out of engagement with said sheet, whereby said photosensitive sheet may be moved freely within said holder;

(e) a sealed, air-tight bag arranged in covering relation to said opening defined by said wall member;

(f) an air reservoir deflatable in response to movement of said retaining element to said first position and inflatable in response to movement of said retaining element to said second position;

(g) an air passage between said reservoir and said bag, whereby the air from said reservoir is forced into said bag as said reservoir is deflated, thereby producing a positive air pressure within said bag and urging the latter against said photosensitive sheet when said retaining element is in said first position;

(h) light barrier means arranged to lie in covering relation to said exposure opening in both positions of said retaining element, said barrier means being opaque to visible light and substantially transparent to X-rays, thus allowing X-ray exposure of said photosensitive sheet while protecting the latter from exposure by visible light; and (i) a cover element arranged to overlie said retaining element and defining a central opening in registration with said exposure opening, said cover element providing an opaque shield preventing entry of light into said holder between said retaining element and the portion of said holder defining said exposure opening.

12. The invention according to claim 11 and further including valve means between said reservoir and the atmosphere, movable to an open position in response to movement of said retaining element from said first to said second position, and to a closed position in response to movement of said retaining element from said second to said first position.

13. The invention according to claim 12 wherein said valve means is mounted for pivotal movement within said cover element and includes a portion which is contacted by said retaining element as the latter is moved between said first and second positions to move said valve means between said open and closed positions.

14. The invention according to claim 13 wherein said bag includes a first wall of flexible sheet material, which opposes said photosensitive sheet and contacts the latter when said retaining element is in said first position, and a second wall of flexible sheet material, which is stretched taut across the opening defined by said wall member.

15. The invention according to claim 14 wherein said light barrier is secured to said cover element in covering relation to the central opening defined thereby.

References Cited

UNITED STATES PATENTS

| 1,550,499 | 8/1925 | Buck | 250—68 |
| 2,566,266 | 8/1951 | Uhle et al. | 250—68 |
| 2,904,688 | 9/1959 | Miller | 250—68 |
| 3,174,039 | 3/1965 | Frede et al. | 250—68 |

FOREIGN PATENTS

| 236,164 | 7/1925 | Great Britain. |

RALPH G. NILSON, *Primary Examiner.*

A. L. BIRCH, *Assistant Examiner.*